(12) United States Patent
Tomihashi et al.

(10) Patent No.: US 6,252,006 B1
(45) Date of Patent: Jun. 26, 2001

(54) FLUORORUBBER COATING COMPOSITION

(75) Inventors: Nobuyuki Tomihashi; Kiyotaro Terasaka; Toshiyuki Kinoshita, all of Osaka (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/242,691

(22) PCT Filed: Aug. 19, 1997

(86) PCT No.: PCT/JP97/02853

§ 371 Date: Mar. 25, 1999

§ 102(e) Date: Mar. 25, 1999

(87) PCT Pub. No.: WO98/07784

PCT Pub. Date: Feb. 26, 1998

(30) Foreign Application Priority Data

Aug. 23, 1996 (JP) .................................. 8-222183

(51) Int. Cl.$^7$ .............................. C08F 15/02; C08K 5/17
(52) U.S. Cl. .................. 525/326.3; 524/236; 524/330; 525/374; 525/378
(58) Field of Search ...................... 524/154, 236, 524/242, 330, 346, 347; 525/326.3, 374, 384, 386

(56) References Cited

FOREIGN PATENT DOCUMENTS

| | | |
|---|---|---|
| 0333062A1 | 9/1989 | (EP) . |
| 0420662 | * 4/1991 | (EP) . |
| 0574319A1 | 12/1993 | (EP) . |
| 57-164143 | 10/1982 | (JP) . |
| 2209942 | 8/1990 | (JP) . |
| 2174461 | 7/1991 | (JP) . |
| 3234752 | 10/1991 | (JP) . |
| 6207068 | 7/1994 | (JP) . |
| 6306241 | 11/1994 | (JP) . |
| 9188793 | 7/1997 | (JP) . |

* cited by examiner

*Primary Examiner*—Tae H. Yoon
(74) *Attorney, Agent, or Firm*—Birch, Stewart, Kolasch & Birch, LLP

(57) ABSTRACT

A coating composition of a fluororubber containing a fluorine-containing elastomeric copolymer which has repeating units of the formula: —$CH_2$— in the backbone, a polyol curing agent, and a salt or a complex compound of a basic compound having a pKa of at least 8 and an organic acid as a curing accelerator. This composition is a one-pack type composition having a long pot life, and can provide a cured coating in a short time at a relatively low temperature. Furthermore, this composition can be applied by dispenser type coating or screen printing, even when the concentration of the fluorine-containing copolymer is high.

6 Claims, No Drawings

FLUORORUBBER COATING COMPOSITION

This application is the national phase under 35 U.S.C. §371 of PCT International Application No. PCT/JP97/02853 which has an International filing date of Aug. 19, 1997 which designated the United States of America.

1. Field of the Invention

The present invention relates to a coating composition of a fluororubber. In particular, the present invention relates to a curable composition of a fluororubber suitable for coating, which comprises a fluorine-containing copolymer, a polyol curing agent, and a specific curing accelerator.

2. Prior Art

When fluororubbers are cured with polyols, curing accelerators (basic compounds) are added to curable compositions. However, when curing accelerators are added to the curable compositions of fluororubbers, for example coating compositions, the pot life of the compositions is shortened, since the compositions are gelled. Thus, two or more pack type compositions are prepared and practically used, but practically usable one-pack type compositions are not known.

It may be contemplated to use a curing accelerator having a low reactivity to formulate a polyl-curable fluororubber coating composition in the form of a one-pack composition. However, such a composition requires a long time and heating at high temperatures to obtain a coated film by drying and calcining the coating compositions.

SUMMARY OF THE INVENTION

One object of the present invention is to formulate a polyol-curable fluororubber composition in the form of a one-pack type composition having a long pot life, and to provide a curable composition of a fluororubber which can provide a cured coating film having a high strength in a short time at a relatively low temperature.

Another object of the present invention is to provide a one-pack type curable composition of a fluorine-containing copolymer, which can be applied by dispenser type coating or screen printing, even when the concentration of the fluorine-containing copolymer is high.

To achieve these objects, the present invention provides a coating composition of a fluororubber comprising a fluorine-containing elastomeric copolymer which comprises repeating units of the formula: $-CH_2-$ in the backbone, a polyol curing agent, and a complex compound of a quaternary ammonium salt having a pKa of at least 8 and an organic acid as a curing accelerator.

DETAILED DESCRIPTION OF THE INVENTION

Now, each component contained in the composition of the present invention will be explained.

(A) A fluorine-containing elastomeric copolymer contained in the composition of the present invention is a fluorine-containing copolymer comprising repeating units of the formula: $-CH_2-$ in the backbone. Typical examples of such a copolymer include fluorine-containing copolymers comprising vinylidene fluoride. Specific examples of such copolymers are those copolymers comprising repeating units having the following structures:

at least one repeating unit selected from the group consisting of $-CF_2-CH_2-$, $-CH_2-CH_2-$ and $-CH_2-CH(CH_3)-$, and at least one repeating unit selected from the group consisting of $-CF_2-CF(CF_3)-$, $-CF_2-CH_2-$ and $-CF_2-(ORf)CF-$ in which Rf is a fluoroalkyl group having 1 to 6 carbon atoms.

Specific examples of such copolymers are a copolymer comprising vinylidene difluoride and hexafluoropropylene, a copolymer comprising vinylidene difluoride, tetrafluoroethylene and hexafluoropropylene, a copolymer of ethylene and hexafluoropropylene, a copolymer of tetrafluoroethylene and propylene, and the like.

Such fluorine-containing elastomeric copolymers are commercially distributed under the trade name of "DAIEL" (trademark) (available from Daikin Industries, Ltd.), "VITONE FLOME" (available from E. I. duPont), "AFLAS" (available from ASAHI GLASS Co., Ltd.), etc.

(B) Polyol Curing Agents

Polyol curing agents used in the present invention are compounds or polymers having at least two hydroxyl groups, in particular, phenolic hydroxyl groups in a molecule, and having a curing capability. Specific examples of polyol curing agents are phenol compounds such as

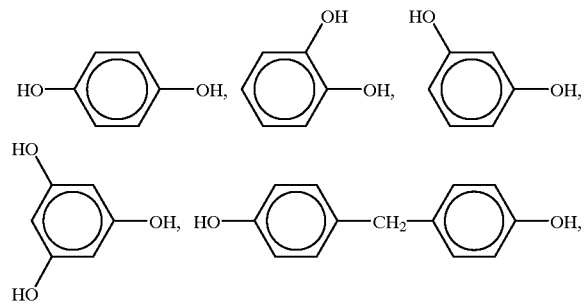

(Amended under PCT Article 34)

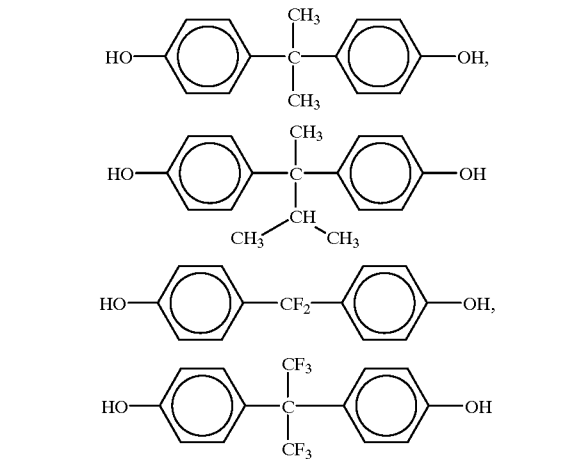

and phenolic resins represented by the formula:

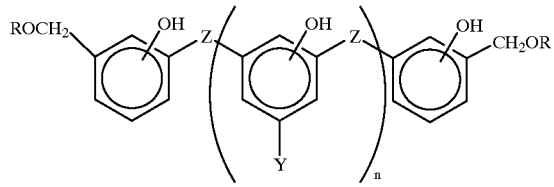

wherein Z is $-CH_2-$ or $-CH_2OCH_2-$, Y is a hydrogen atom, a halogen atom, $-R$, $-CH_2OR$ or $-OR$ in which R is an alkyl group having 1 to 4 carbon atoms, and n is an integer of 0 to 100.

Among them, hydroquinone, bisphenol A, bisphenol AF, and resorcinol phenolic resins are preferable.

(C) Curing accelerators

Examples of quaternary ammonium salts which constitute curing accelerators which are used in the present invention include the following compounds:

Quaternary Ammonium Salts

A quaternary ammonium salt of the formula:

$$NR_4X \text{ or } R_3N-R'-NR_3.2X$$

wherein X is an acid radical or a hydroxyl group; R groups are the same or different and represent an alkyl group having 1 to 20 carbon atoms, a halogenated alkyl group having 1 to 20 carbon atoms or an aryl group having 7 to 20 carbon atoms, provided that two or more R groups may together form a carbocyclic group or a heterocyclic group; R' is an alkylene group having 2 to 21 carbon atom or a phenylene-dialkylene group having 8 to 12 carbon atoms.

Examples of acid radicals include halides, sulfate, sulfite, bisulfite, thiosulfate, sulfide, polysulfide, hydrogen sulfide, thiocyanate, carbonate, bicarbonate, nitrate, carboxylate, borate, phosphate, biphosphate, phosphite, perchlorate, bifluoride, arsenate, ferricyanide, ferrocyanide, molybdate, selenate, selenite, uranate, tungstate, etc.

Specific examples of quaternary ammonium salts include alkyl and aralkyl quaternary ammonium salts (e.g. trimethylbenzylammonium chloride, triethylbenzylammonium chloride, dimethyldecylbenzylammonium chloride, triethylbenzylammonium chloride, myristylbenzyldimethylammonium chloride, dodecyltrimethylammonium chloride, dimethyltetradecylbenzylammonium chloride, trimethyltetradecylammonium chloride, coconuttrimethylammonium chloride, stearyltrimethylammonium chloride, distearyldimethylammonium chloride, tetrabutylammonium hydroxide, 1,4-phenylenedimethylene-bistrimethylammonium dichloride, ethylenebistriethylammonium dibromide, etc.), and quaternary 1,8-diaza-bicyclo[5.4.0]-7-undecenium salts (e.g. 8-methyl-1,8-diaza-bicylo[5.4.0]-7-undecenium chloride, 8-methyl-1,8-diaza-bicylo[5.4.0]-7-undecenium iodide, 8-methyl-1,8-diaza-bicylo[5.4.0]-7-undecenium hydroxide, 8-methyl-1,8-diaza-bicylo[5.4.0]-7-undecenium methylsulfate, 8-methyl-1,8-diaza-bicylo[5.4.0]-7-undecenium bromide, 8-propyl-1,8-diaza-bicylo[5.4.0]-7-undecenium bromide, 8 -dodecyl-1,8-diaza-bicylo[5.4.0]-7-undecenium chloride, 8-dodecyl-1,8-diaza-bicylo[5.4.0]-7-undecenium hydroxide, 8-eicosyl-1,8-diaza-bicylo[5.4.0]-7-undecenium chloride, 8-tetracosyl-1,8-diaza-bicylo[5.4.0]-7-undecenium chloride, 8-benzyl-1,8-diaza-bicylo[5.4.0]-7-undecenium chloride, 8-benzyl-1,8-diaza-bicylo[5.4.0]-7-undecenium hydroxide, 8-phenethyl-1,8-diaza-bicylo[5.4.0]-7-undecenium chloride, 8-(3-phenylpropyl)-1,8-diaza-bicylo[5.4.0]-7-undecenium chloride, etc.).

Organic acids having 1 to 9 carbon atoms, preferably 1 to 4 carbon atoms are used as organic acids constituting the curing accelerators of the present invention.

Organic acids having 10 or more carbon atoms are less preferable, since they remain in coated films.

Preferable examples of organic acids are monocarboxylic acids such as fumaric acid, acetic acid, propionic acid, etc.; and dicarboxylic acids such as oxalic acid, malonic acid, succinic acid, etc.

Organic acids are used to suppress the polyol curing of fluorine-containing copolymers in the compositions. The curing of fluorine-containing copolymers is suppressed by organic acids in the compositions, but the organic acids evaporate or decompose when the compositions are applied onto a substrate, dried and calcined. Thus, the above basic compounds accelerate the curing reaction.

The composition of the present invention comprises 0.1 to 10 wt. parts, preferably 1 to 5 wt. parts of a polyol curing agent, and 0.01 to 10 wt. parts, preferably 0.05 to 5 wt. parts of a curing accelerator, per 100 wt. parts of a fluorine-containing copolymer.

When the amount of a curing accelerator is less than the above lower limit, the curing of the copolymer hardly proceeds. When the amount of a curing accelerator exceeds the above upper limit, it may be difficult to control a curing reaction.

The composition of the present invention may contain various additives which are added to conventional fluororubber compositions, for example, fillers, colorants, acid-scavengers, and the like, in addition to the above polyol curing agents and curing accelerators.

Examples of fillers are carbon black, white carbon, calcium carbonate, barium sulfate, etc., and examples of colorants are inorganic pigments, compound oxide pigments, etc.

Examples of acid-scavengers are magnesium oxide, lead oxide, zinc oxide, lead carbonate, zinc carbonate, double salts such as hydrotalcite, etc. Compounds having a high activity (reactivity) such as calcium hydroxide are less preferred, since they tend to cause gelatinization.

Preferably, acid-scavengers have a smaller pKa than that of the above basic compounds. When the pKa of acid-scavengers is high, the compositions of the present invention tend to be gelled.

In general, an acid-scavenger is compounded in an amount of from 1 to 40 wt. parts per 100 wt. parts of a fluorine-containing copolymer, depending on its activity.

Furthermore, non-tackiness can be imparted to the compositions of the present invention by the compounding of fluororesins (e.g. polyvinylidene fluoride (PVdF), ethylene-tetrafluoroethylene copolymers (ETFE), polychlorotrifluoroethylene (CTFE), ethylene-perfluoroalkyl vinyl ether copolymers (EPA), tetrafluoroethylene-hexafluoropropylene copolymers (FEP), perfluoroalkyl vinyl ether polymers (PFA), polytetrafluoroethylene (PTFE), etc.).

The compositions of fluorine-containing elastomeric copolymers according to the present invention can be used as surface-modifiers of metals or rubbers; metal gaskets and other sealing or coating materials which are required to have heat resistance, solvent resistance, chemical resistance, and non-tackiness; and coating materials to coat rolls and belts for office automation equipment; and the like. Fabrics, which are impregnated with the compositions of the present invention and baked, can be used as the materials of sheets and belts.

The compositions of the present invention may be applied as sealants of sealing members which have been difficult to shape, precoated metals formed by treating metal plates with primers, packing rubbers, O-rings, diaphragms, chemical-resistant tubes, caps of vials, fuel hoses, and the like.

The compositions of the present invention may be prepared by the same methods as those used to prepare conventional curable compositions of fluorine-containing copolymers.

A basic compound and an organic acid, which constitute curing accelerators, are preferably dissolved in alchol together with a polyol curing agent.

A fluororubber is kneaded with optional fillers, colorants and acid-scavengers, and optionally with a polyol curing agent, and then dissolved in a solvent such as ketones, esters or ethers.

If necessary, a small amount of coating additives such as silicone oils, or a small amount of poor solvents such as toluene, xylene, etc. is added to the compositions of the present invention.

Then, the alcoholic solution containing a basic compound, an organic acid and optionally a polyol curing agent is mixed in the above solution of a fluororubber to obtain a coating composition.

In this case, the concentration of a fluororubber is preferably from 10 to 60 wt. % of the whole composition.

The compositions of the present invention can be applied to substrates and cured by the same methods as those used to apply and cure conventional curable compositions of fluorine-containing copolymers.

For example, the compositions are applied to substrates to be coated by brush coating, spray coating, dip coating, flow coating, dispenser coating, screen coating, etc. according to the properties of the compositions, and solvents are evaporated off. Then, the coated compositions are baked at a temperature of from 150 to 250° C. for 20 to 90 minutes.

It is preferable to form a primer layer on the surface of a substrate with silane primers, silicone primers, etc. to increase the adhesion between the substrate and the composition.

The curable compositions of fluorine-containing elastomeric copolymers according to the present invention have good storage stability and can contain the fluorine-containing copolymers at a high concentration, although they are in the form of a one-pack type composition.

EXAMPLES

The present invention will be illustrated by the following examples.

Examples 1–5 and Comparative Examples 1 and 2

Example 1

Preparation of a Coating Composition

A fluororubber (DAIEL G-801 available from Daikin Industries, Ltd.) (100 wt. parts) was kneaded with open rolls together with MT carbon black (20 wt. parts) and an acid-scavenger (HYDROTALCITE DHT-4A available from Kyowa Chemical Industries, Ltd.; pH=9) (5 wt. parts) to obtain a compound. The compound was dissolved in a mixed solvent of butyl acetate (400 wt. parts) and methyl isobutyl ketone (400 parts).

Separately, bisphenol AF (2 wt. parts) as a polyol curing agent and DBU-b (8-benzyl-1,8-diaza-bicyclo[5.4.0]-7-undecenium chloride having pKa of 11.5) (0.5 wt. parts) as a basic compound were dissolved in ethanol (17.5 wt. parts). Then, acetic acid (2 wt. parts) and xylene (4 wt. parts) were added to the solution. The obtained solution was mixed with the above solution of the compound with a disper to obtain a coating composition.

Stability Test

A quantity of the coating composition was charged in a polyethylene bottle and kept standing at 25° C. After 2 days, 7 days, 2 weeks, one month and three months, the properties of the composition were observed.

Properties of a Coating Film

The coating composition was poured in a metal vat and dried at room temperature for 5 days, and then at a temperature of 80 to 100° C. for 2 days, followed by baking at 200° C. for 30 minutes. The obtained film was peeled off from the vat, and stamped in the form of a JIS No. 4 dumbbell. This sample was subjected to a tensile test at a pulling rate of 500 mm/min.

Comparative Example 1

The same procedures as those of Example 1 were repeated, except that no acetic acid was used in the preparation step of the coating composition.

Example 2

The same procedures as those of Example 1 were repeated, except that MgO (MA-150 available from Kyowa Chemical Industries, Ltd.) (3 wt. parts) was used in place of DHT-4A (5 wt. parts) in the preparation step of the coating composition.

Example 3

The same procedures as those of Example 1 were repeated, except that HITANOL 4020 (available from Hitachi Chemical Co., Ltd.; a main component: resol phenolic resin; solid content: 50%) (10 wt. parts) was used in place of bisphenol AF in the preparation step of the coating composition.

Example 4

The same procedures as those of Example 1 were repeated, except that DAIEL G-501 NK (available from Daikin Industries, Ltd.) was used in place of DAIEL G-801 in the preparation step of the coating composition.

Comparative Example 2

The same procedures as those of Example 1 were repeated, except that MgO having a pKa of 11 (MA-150) (3 wt. parts) and Ca(OH)$_2$ having a pKa of 13 (6 wt. parts) were used in place of DHT-4A (5 wt. parts) in the preparation step of the coating composition.

Comparative Example 3

The same procedures as those of Example 1 were repeated, except that pyridine having pKa of 5.3 was used in place of DBU-b in the preparation step of the coating composition.

The stability of the coating compositions and the strength of the films are summarized in Table 1.

TABLE 1

| Component (wt. %) | Ex. 1 | Comp. Ex. 1 | Ex. 2 | Ex. 3 | Ex. 4 | Comp. Ex. 2 | Comp. Ex. 3 |
|---|---|---|---|---|---|---|---|
| Fluororubber | | | | | | | |
| DAIEL G-801 | 100 | 100 | 100 | 100 | | 100 | 100 |
| DAIEL G-501NK | | | | | 100 | | |
| MT carbon black | 20 | 20 | 20 | 20 | 20 | 20 | 20 |
| Acid-scavenger | | | | | | | |
| Hydrotalcite DHT-4A | 5 | 5 | | 5 | 5 | | 5 |
| MgO MA-150 | | | 3 | | | 3 | |
| Ca(OH)$_2$ | | | | | | 6 | |
| Polyol curing agent | | | | | | | |
| Bisphenol AF | 2 | 2 | 2 | | 2 | 2 | 2 |
| HITANOL | | | | 10 | | | |
| Basic compound | | | | | | | |
| DBU-b | 0.5 | 0.5 | 0.5 | 0.5 | 0.5 | 0.5 | |
| Pyridine | | | | | | | 2 |
| Acetic acid | 2 | 0 | 2 | 2 | 2 | 2 | 2 |
| Ethanol | 17.5 | 17.5 | 17.5 | 4.5 | 17.5 | 17.5 | 17.5 |
| n-Butyl acetate | 400 | 400 | 400 | 400 | 400 | 400 | 400 |
| Methyl isobutyl ketone | 400 | 400 | 400 | 400 | 400 | 400 | 400 |
| Xylene | 4 | 4 | 4 | 4 | 4 | 4 | 4 |
| Stability of coating composition | No change after 6 months | Gelled in 2 days | Gelled after 3 months | No change after 6 months | No change after 6 months | Gelled after 8 hours | No change after 6 months |
| Strength of film (Kgf/cm$^2$) [JIS K 6301 No. 4 dumbbell] | 96 | 104 | 100 | 84 | 90 | 110 | 40 |
| Elongation of film (pulling rate: 500 mm/min.) | 290% | 280% | 280% | 320% | 330% | 250% | 650% |

What is claimed is:

1. A coating composition of a fluororubber comprising:
   (a) a fluorine-containing elastomeric copolymer which comprises repeating units of the formula —CH2— in the backbone,
   (b) a polyol curing agent, and
   (c) a complex comprising a quaternary ammonium salt and an organic acid as a curing accelerator,
   wherein the ammonium salt has a pKa of at least 8.

2. A coating composition according to claim 1, wherein said curing accelerator is a complex of a quaternary ammonium salt having a pKa of at least 8, and an organic acid having 1 to 9 carbon atoms.

3. A coating composition according to any one of claim 1, which further comprises an acid-scavenger having a pKa smaller than that of said quaternary ammonium salt.

4. The coating composition according to claim 1, wherein said organic acid has 1 to 9 carbon atoms.

5. The coating composition according to claim 1, wherein said organic acid has 1 to 4 carbon atoms.

6. The coating composition according to claim 1, wherein said organic acid is selected from the group consisting of fumaric acid, acetic acid, propionic acid, oxalic acid, malonic acid, and succinic acid.

* * * * *